(No Model.)

C. H. COOK.
ANTIFRICTION BEARING.

No. 509,199. Patented Nov. 21, 1893.

Witnesses:
C. E. Buckland,
John P. Healy.

Inventor:
Charles H. Cook,
by Harry P. Williams
Atty.

UNITED STATES PATENT OFFICE.

CHARLES H. COOK, OF WINDSOR, ASSIGNOR, BY MESNE ASSIGNMENTS, OF ONE-HALF TO EDWINA E. STALKNER, OF HARTFORD, CONNECTICUT.

ANTIFRICTION-BEARING.

SPECIFICATION forming part of Letters Patent No. 509,199, dated November 21, 1893.

Application filed February 1, 1893. Serial No. 460,512. (No model.)

*To all whom it may concern:*

Be it known that I, CHARLES H. COOK, a citizen of the United States, residing at Windsor, in the county of Hartford and State of Connecticut, have invented certain new and useful Improvements in Antifriction-Bearings, of which the following is a full, clear, and exact specification.

The invention relates to the class of anti-friction bearings particularly adapted for the wheels of sulkies, buggies and light road vehicles which are provided for training and racing trotting horses and for general pleasure driving; the object being to construct a simple, cheap, durable and readily adjustable anti-friction bearing for the wheels of such vehicles.

Figure 1:
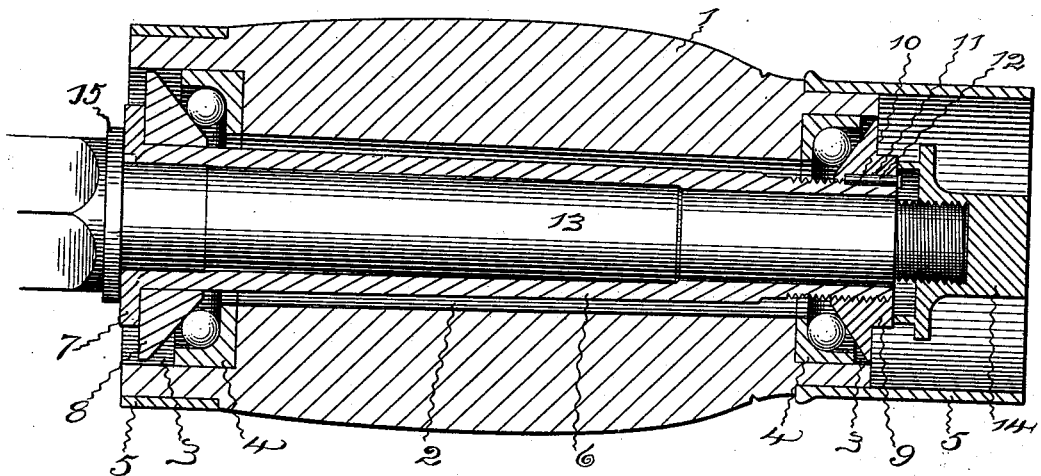
Figure 2:
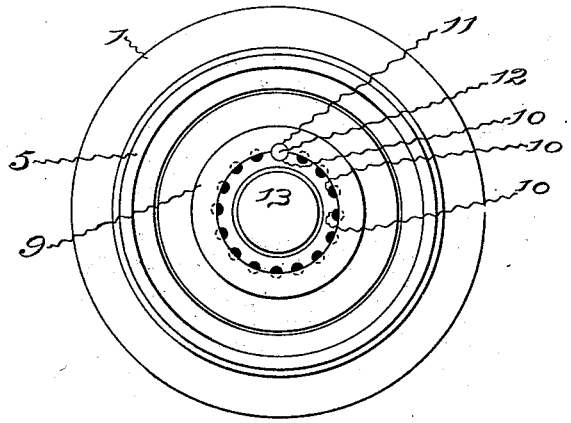

Referring to the accompanying drawings: Figure 1 is a central vertical section of a hub and axle provided with my improved bearing. Fig. 2 is a view looking at the end of the hub and axle with the nut removed.

In the views 1 indicates a hub which may be made of wood, iron or any another material commonly used for such a purpose. This hub is provided with the usual central opening, 2, for the passage of the axle. At each end this opening through the hub is enlarged so as to form recesses, 3, and into these recesses annular metallic bushings, 4, are driven, while on the exterior around the ends are placed the metallic bands or ferrules, 5, which add to the finish as well as strengthen the hub. In the central opening through the hub, in place of the usual axle box is a sleeve, 6, that has an exterior diameter somewhat smaller than the opening through the hub and an interior diameter which closely fits the axle. This sleeve, which is the usual axle box, at the inner end is provided with a flange, 7, and driven on to the sleeve close against the flange is a tapering ring or collar, 8, while on the opposite end, which is threaded for a short distance, is screwed a tapering ring or collar, 9. Around the periphery of the outer end of the sleeve are a number of grooves, 10, and in the inner face of the threaded collar, 9, is a groove, 11, which always registers with some one of the grooves, 10, in the end of the sleeve to form a socket into which a locking pin, 12, may be driven to lock the collar, 9, and prevent its rotation on the sleeve. The spindle, 13, of the axle slips into the sleeve and is there held by the nut, 14, that is screwed upon the end of the spindle in such manner as to drive and hold the sleeve tightly against the shoulder, 15, where the axle is turned down in forming the spindle. The inner face of the nut, 14, is hollowed out so that it does not come in contact with the locking pin, 12, but screws against the sleeve outside of the locking pin. Balls, 16, are placed between the bushings in the hub and the collars on the sleeve to support the parts and reduce the friction when running. By means of this construction the axle and sleeve are practically held as one piece and although the wheel at any time may be removed from the axle there is no turning part that bears against the nut. The parts are readily adjusted and all wear may be taken up by simply removing the locking pin, turning up the adjustable collar and replacing the pin. The hub is strong and durable, and rotates freely on the balls without friction.

The inner portions of the recesses of the bushings are semicircular or rounded so as to form a seat for the balls as shown in Fig. 1 of the drawings.

I claim as my invention—

In combination with a wheel hub having a central perforation and recessed ends with cup-shaped bushings inserted in the recesses, a sleeve smaller in diameter than the perforation through the hub, said sleeve bearing a tapering collar near each end, an axle fitting the sleeve, balls inserted between the bushings and the collars, an adjustable locking device for securing the outer collar against rotation on the sleeve, and a nut screwed upon the axle outside of the locking device so that the latter cannot become displaced, substantially as specified.

CHARLES H. COOK.

Witnesses:
H. R. WILLIAMS,
C. E. BUCKLAND.